US006760039B2

(12) United States Patent
Keeley

(10) Patent No.: US 6,760,039 B2
(45) Date of Patent: Jul. 6, 2004

(54) PROGRAM FOR GRAPHIC PRIORITY EDITING

(76) Inventor: Thomas M. Keeley, 1040 Thornridge Ct., Brookfield, WI (US) 53045

( * ) Notice: Subject to any disclaimer, the term of this patent is extended or adjusted under 35 U.S.C. 154(b) by 461 days.

(21) Appl. No.: 09/770,843

(22) Filed: Jan. 26, 2001

(65) Prior Publication Data

US 2001/0045960 A1 Nov. 29, 2001

Related U.S. Application Data

(63) Continuation-in-part of application No. 09/580,813, filed on May 26, 2000.
(51) Int. Cl.[7] .................................................. G09G 5/00
(52) U.S. Cl. ...................................................... 345/637
(58) Field of Search .......................................... 345/637

(56) References Cited

U.S. PATENT DOCUMENTS

| 6,154,757 A | * | 11/2000 | Krause et al. ............... 715/530 |
| 6,426,761 B1 | * | 7/2002 | Kanevsky et al. ........... 345/788 |
| 6,539,374 B2 | * | 3/2003 | Jung .............................. 707/4 |

* cited by examiner

Primary Examiner—Mark Zimmerman
Assistant Examiner—Arnold Adam
(74) Attorney, Agent, or Firm—Quarles & Brady LLP

(57) ABSTRACT

A word processing tool for idea generation represents text-identified ideas of a database in either the form of a text outline or in the form of a tree structure of nodes. Ideas of a given level can have priorities to change the ordering of the depiction of ideas in those levels. The priorities may be adjusted in a priority window allowing drag and drop reordering of idea and numeric weighting of ideas using a slider control. Loose dependence between ordering and weighting insures consistency of the two in the priority window.

10 Claims, 3 Drawing Sheets

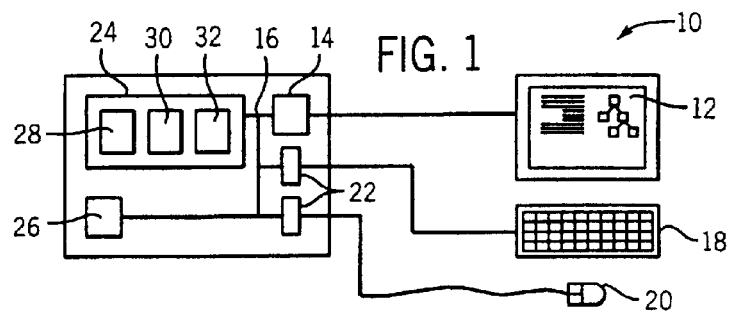
FIG. 1
| # | PARENT | TYPE | TITLE | DESC. | VALUE NO. | NODE |
|---|---|---|---|---|---|---|
| 1 | — | I | CONSIDERATIONS IN BUYING A NEW CAR | — | 100 | — |
| 2 | 1 | P | OLD CARS ARE EXPENSIVE | — | 100 | — |
| 3 | 2 | S | REPAIR COSTS INCREASE | — | 100 | — |
| 4 | 2 | O | INSURANCE COSTS DECREASE | — | 100 | — |
| 5 | 2 | O | LOAN PAYMENTS END | — | 100 | — |
| 6 | | | | — | 100 | |
FIG. 3
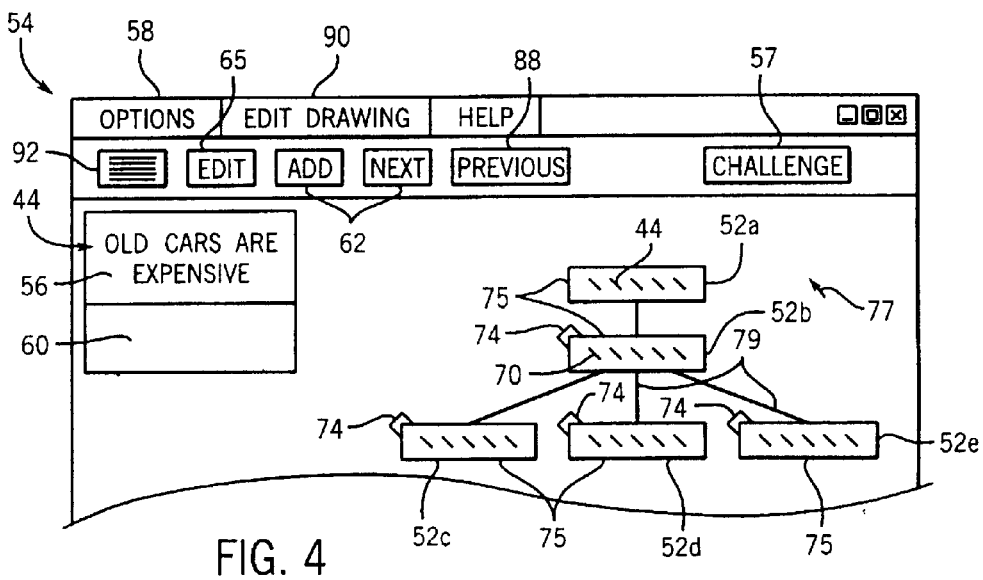
FIG. 4

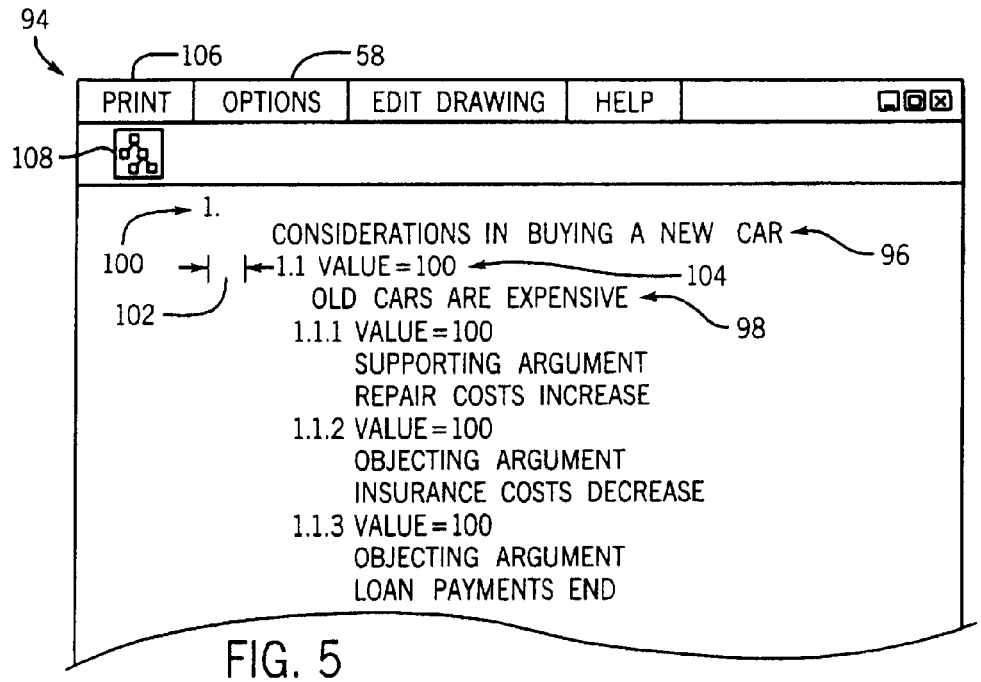
FIG. 5
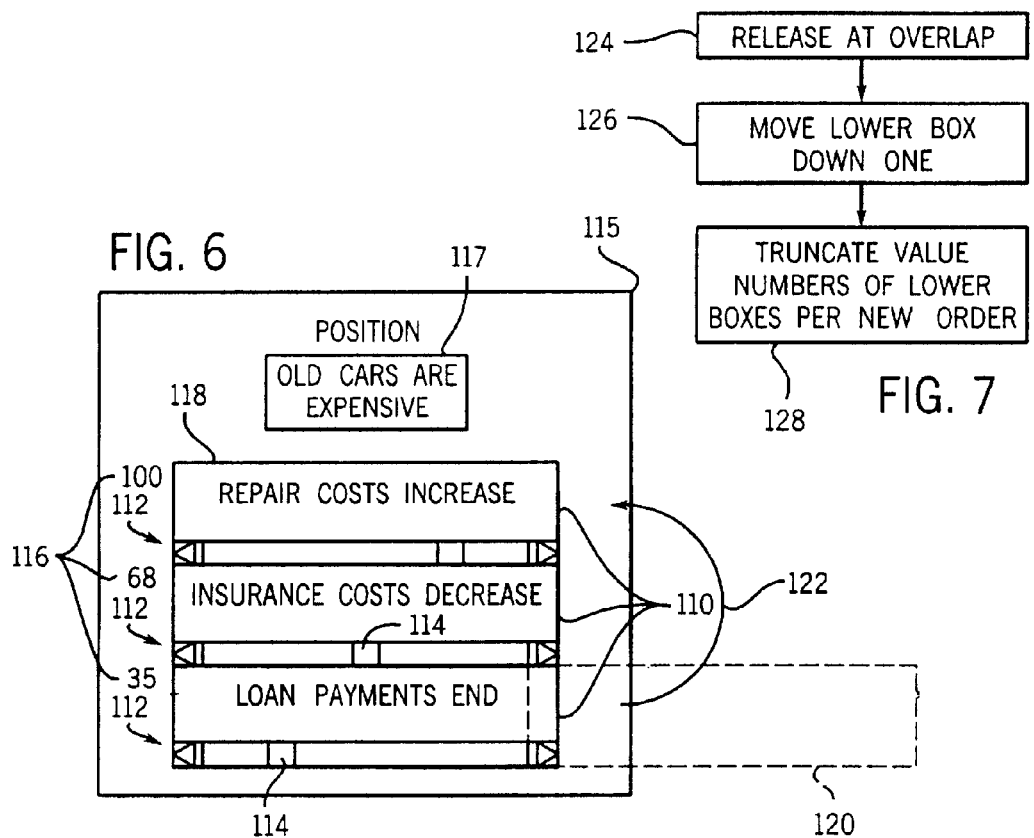
FIG. 6
FIG. 7

PROGRAM FOR GRAPHIC PRIORITY EDITING

CROSS-REFERENCE TO RELATED APPLICATIONS

This application is a continuation in part of U.S. patent application Ser. No. 09/580,813 filed May 26, 2000

STATEMENT REGARDING FEDERALLY SPONSORED RESEARCH OR DEVELOPMENT

BACKGROUND OF THE INVENTION

The present invention relates to text processing programs for electronic computers, and in particular, to a text processing program that provides symmetric, outlining and tree-diagram text organization modes.

Text documents are a convenient way to share ideas. Text is easily generated and edited using a word processor or the like, and easily communicated or stored in either electronic or paper form.

Unfortunately, the relationship between ideas, as expressed in text alone, is not always clear. To remedy this problem, it is common to impose an outline structure on text documents in which "subservient" ideas are placed in paragraphs indented and underneath paragraphs representing "dominant" ideas. Each paragraph may be numbered in a way that further illustrates this relationship. By using multiple levels of indenting, outlining allows an arbitrarily complex set of dominant and subservient text elements to be represented. The outlining process is supported by many word processors which allow the user to switch between an outline mode and a standard text mode and which automate the process of numbering outlined paragraphs.

Outlining is nevertheless limited in its ability to convey complex relationships between ideas. When many ideas are presented, related dominant ideas are often separated by many subservient ideas with the result that the relationship between the dominant ideas is obscured. Further, the indentation of paragraphs (or numbering) provides little additional information about the relationship between ideas beyond the relatively general relationships of dominance and subservience. Finally, the outlining process in itself provides little guidance to the user in organizing text or in generating ideas.

What is needed is a text-processing tool that provides a more flexible method of organizing ideas and revealing the relationship between ideas and which promotes good organizational structure.

BRIEF SUMMARY OF THE INVENTION

The present invention provides a computer tool to assist a user in developing and organizing ideas. Operating in either a text outline mode or a tree mode, the tool allows numeric priorities to be attached to ideas of a common level in either the outline or tree and redraws the outline or tree to comport with those priorities. A convenient user interface is provided to allow these priorities to be easily established. The invention further provides templates to prompt the users in exploring their ideas. The user creates levels of "issues", "positions", and arguments". Open-ended challenges are provided at the issue and position levels to help the user explore positions in response to issues, and arguments in response to positions. Such templates may be developed by experts to guide the user in particular fields of inquiry.

Specifically, the present invention provides a program for the organization of ideas using an electronic computer, the electronic computer having a user input device and a graphics display. The program comprising instructions is executed on the electronic computer to accept text identified ideas from the user via the user input device and to accept (at least one) idea hierarchy instructions from the user via the user input device, the hierarchy instructions relating the accepted ideas in dependencies. The program then displays representations of the ideas on the graphic display as organized into levels defined by common dependency. Numeric priorities for the ideas of at least one level may be accepted from the user causing the ideas of the at least one level on the graphic display (for example in a text outline) to be arranged according to the priorities when it is redisplayed.

Thus it is one object of the invention to improve the representation of dependent ideas through the introduction of level priorities such as promote more important ideas to positions of visual dominance.

The displayed representation of the ideas may be as text displayed in a text outline according to the dependencies of ideas associated with the text, the text outline including paragraphs arranged beneath other paragraphs on which they depend; and the paragraphs of a level may be ordered according to the priorities of the ideas to which they are related.

Conversely, the displayed representations of the ideas are node symbols arranged in a tree according to their dependencies, the tree structure including branches visually connecting node symbols to other node symbols on which they depend; and the nodes of a level may be ordered according to the priorities of the ideas to which they are related.

Thus it is one object of the invention to provide a tool that allows either a tree or text outline representation of data and thus which allows the user to partake of the strength of each form.

The user may be provided with a list of representations of identified ideas of a level and wherein priorities are assigned by the user by changing the order of the representations of identified ideas within the list. The user may be allowed to change the order of representations of identified ideas (and thus their priority) by selection of a given representation of an identified idea as displayed on the graphics display using the user input device and moving the representations of the identified idea within the list as displayed on the graphic display device using the user input device. Alternatively or in addition a slide control for each identified idea in the list may be displayed that may be manipulated by the user-input device to enter a number priority value.

Thus it is yet another object of the present invention to provide an intuitive and easy to use graphical interface for assigning priorities to objects.

When the representation of an identified idea is moved within the list, the priority of at least one idea identifier may be changed so that the priorities of all identified ideas in the list remain monotonically decreasing. Priorities may be similarly adjusted when the sliders are moved to preserve monotonicity of priorities.

Thus it is another object of the invention to allow free adjustment of priorities of one element in the list while maintaining consistency with the priorities of other elements within the list.

The invention may display representations of the ideas on the graphic display as organized into levels defined by common dependency and after acceptance of a given text identified idea from the user in at least one predefined level; prompt the user as to possible additional text identified ideas for inclusion in a next level having ideas dependent on the idea of the given text identified idea. The predefined categories may be are ISSUE, POSITION and ARGUMENT and the user is prompted with possible ARGUMENTS when the given text identified idea is a POSITION and the user may be prompted with possible POSITIONS when the given text identified idea is an ISSUE. The user may be prompted with a set of open-ended questions that may be augmented by text from the identified ideas of the given position.

Thus it is another object of the invention to provide a tool not only for organizing ideas but one that assist the user in exploring the boundaries of the ideas.

Further, the user may select from a set of predefined generic identified ideas and hierarchies and to provide an editor for editing the predefined generic identified ideas and hierarchies.

Thus it is another object of the invention to communicate to the user the experience of experts in the field that may be applied to the problems being analyzed by the user. This expertise may be conveyed in "skeletal" ideas and hierarchies or in the prompts described above.

The foregoing and other objects and advantages of the invention will appear from the following description. In this description, reference is made to the accompanying drawings which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

BRIEF DESCRIPTION OF THE DRAWINGS

FIG. 1 is a block diagram of a standard desktop computer system showing a graphics display screen, a keyboard, and a mouse communicating with a processor and memory holding the program of the present invention;

FIG. 3 is a fragmentary representation of a database receiving the data entered by the process of FIG. 2 showing a record structure holding the entered text data and its hierarchy by the recording of the entry's parent;

FIG. 4 is an example display on display of FIG. 1 showing a tree mode representation of the data of the database of FIG. 3;

FIG. 5 is a figure similar to that of FIG. 4 showing an outline version of the same data of FIG. 3;

FIG. 6 is a representation of a display of a prioritizing list box control for inputting priority data associated with the idea-identifiers entered in the process of FIG. 2; and FIG. 7 is a flow chart showing operation of the program of the present invention in adjusting priorities according to manipulation of the list box of FIG. 6 by the user.

DETAILED DESCRIPTION OF THE INVENTION

Figure 2:
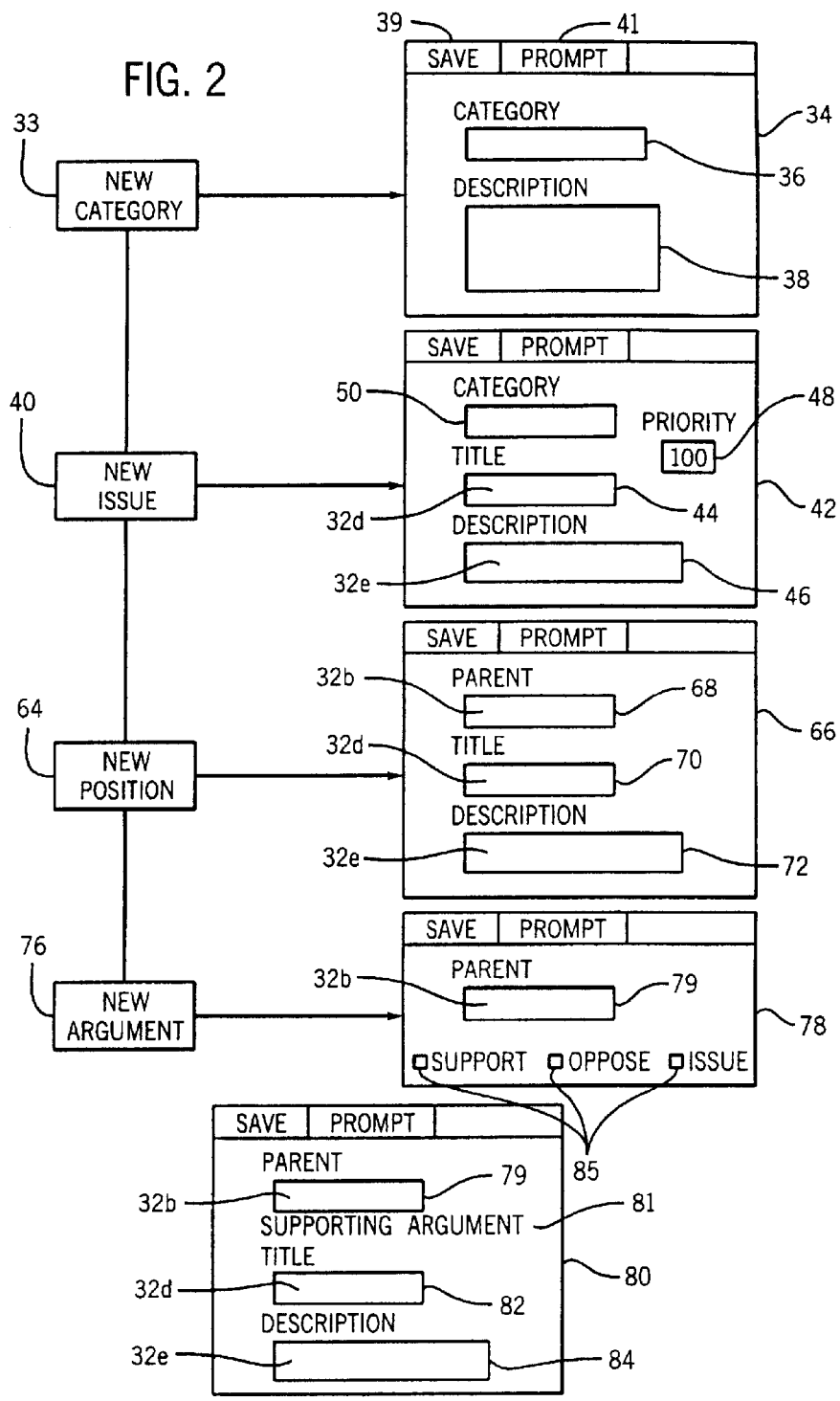
FIG. 2 is a flow chart showing the entry of text data by the user to represent particular ideas of: CATEGORY, ISSUE, POSITION, and ARGUMENT.

Referring now to FIG. 1, a computer 10 may provide for a graphic display screen 12 such as a cathode ray tube or liquid crystal display monitor or the like communicating with a video card 14 attached to an internal bus 16 of the computer. A keyboard 18 and mouse 20 may likewise communicate via ports 22 with the internal bus 16.

The internal bus 16 also joins with a memory 24 and a processor 26 to allow intercommunication therebetween.

The memory 24 may include an operating system 28, the program 30 of the present invention, and a database 32 created by the program 30 as will be described. The operating system may, for example, be a Windows operating system manufactured by Microsoft Corporation as is well known in the art. Generally, as will be described, the program 30 will be executed by the processor 26 in the environment of the operating system 28 to provide signals to the video card 14 for the display of data on the graphic display screen 12 and receive data from the user through the keyboard 18 and mouse 20. The program 30 may be written in a graphical object-oriented language such as Visual Basic, Delphi or C++, such languages which provide high level objects for "buttons", "text boxes" and similar objects as well as database structures as will be described below.

Referring now to FIG. 2, the program 30 of the present invention generally allows for the inputting of text data identifying ideas. As will be described below, the user may characterize each idea as a CATEGORY, an ISSUE, a POSITION and a SUPPORTING ARGUMENT or OPPOSING ARGUMENT. These different types of ideas have a natural order, that is, POSITIONS are responsive to ISSUES. ARGUMENTS support or oppose POSITIONS. New ISSUES are spawned from POSITIONS or ARGUMENTS. Accordingly, the program will prompt the user for particular types of ideas 52 depending on a selected parent idea 52 as will be described below. Although not shown in FIG. 2, it will be understood that the pendancy of ISSUE/POSITION/ISSUE maybe continued to infinite depth limited only by the capacity of the particular computer.

The data entry portion of the program 30 begins at a process block 33 in which the user is presented with a CATEGORY entry screen 34 allowing a CATEGORY to be entered. Generally a CATEGORY describes the general topic to which ideas to be generated relate, and is intended simply as a name under which to collect similar investigations for possible reuse or easy reference.

Using the keyboard 18 and/or mouse 20 according to well-understood graphic user interface conventions, the user may enter a new CATEGORY on the CATEGORY entry screen 34 presented on the graphic display screen 12. The CATEGORY entry screen 34 provides for the entry of a category name in CATEGORY name text-entry box 36 and a description of the CATEGORY in CATEGORY description text-entry box 38.

The CATEGORY entry screen 34 provides for a prompt button 41 which provides the user instructions or hints as to the appropriate data to be entered into the CATEGORY name text-entry box 36 and a save button that saves the entered data to the database 32 and closes the CATEGORY entry screen window upon completion.

As is understood in the art, each of the text-entry boxes described above and as will be described below, allows for text entry and rudimentary editing of that text according to techniques well known in the art as provided by the windows operating system. Further each of the entry screens including that described above and hereafter will include the prompt and save buttons and these will not be described again. An example prompt might say to not construct ISSUES in terms of yes or no questions and might give sample formulations for question construction.

Once a CATEGORY has been entered at process block 33, the user must select (or enter) a top ISSUE. This selection process (for any ISSUE not just top ISSUES) is invoked by process block 40 which provides for an ISSUE entry screen 42 allowing entry of a title 32d of the ISSUE in ISSUE title text-entry box 44 and a description 32e of the ISSUE in ISSUE description text-entry box 46. While the preferred embodiment separates the title and description, it will be understood that these elements may in fact be combined without substantially diminishing the utility of the invention. A value number 32f may be entered in priority text-entry box 48 to distinguish this ISSUE in priority among other ISSUES of a similar hierarchical level as will be explained. The ISSUE entry screen 42 also provides a CATEGORY text-entry box 50 which initially holds the CATEGORY previously entered in process block 33 or the CATEGORY of a selected node (as will be explained below) but which may be changed so as to link the ISSUE to another CATEGORY. CATEGORY is shown to the user to confirm that the top-level issue is being added to the correct category.)

Referring now to FIG. 3, in an example use of this program, a new ISSUE may be entered as with the title: "Considerations In Buying A New Car". This title 32d is entered into a record of the database 32 having a record number 32a and defining generally an ISSUE idea 52a. A description 32e may also be optionally entered via the ISSUE description text-entry box 46 in like designated column of the record for the idea 52a, the description being additional text describing the ISSUE. The type 32c of ISSUE idea 52a as an ISSUE is also stored. Generally one record or row of the database 32 will correspond to one idea 52.

Once an ISSUE idea 52a has been defined, the user may view the tree mode screen 54 as shown in FIG. 4. The ISSUE idea 52a appears as a box-shaped node 75 incorporating within it the title 32d of the ISSUE idea 52a. A text window 56 in the upper left-hand corner of the screen provides the title 33d in larger or more complete form so as to allow the representation of the ISSUE idea 52a by the node 75 to be compact. Optionally, according to an option menu 58, a description display window 60 may also be displayed, holding the description 32e previously entered in the ISSUE description text-entry box 46 associated with the ISSUE idea 52a. The description display window 60 and text window 56 will always reference a currently selected node 75 (the selection process to be described) so as to allow easy review of multiple nodes 75.

At this point, the user will typically use the tree mode screen 54 for further entry of ideas 52 using the ADD button 62. The type of idea (e.g., ISSUE, POSITION or ARGUMENT) is determined from the context of the tree mode screen 54 and, in particular, which node 75 is selected by the user. Selection of a node 75 (and its underlying idea 52) is accomplished by conventional techniques understood in the art by moving a cursor 77 to the particular text-entry box and activating a mouse button on the mouse 20. The node 75 is visually highlighted when it is selected. The cursor highlights the selected node by color, and also highlights the parents and children nodes. Specifically, parents are highlighted with red; the selected node with yellow; and children nodes with blue in contrast to their normal black and white depiction.

If the node 75 selected relates to an ISSUE idea 52a (as is the case with this example), then when the ADD button 62 is pressed, the program will proceed to process block 64 as shown in FIG. 2 for adding of a new POSITION idea 52b, the only type of idea 52 that may be dependent on the selected ISSUE idea 52a. Invoking the ADD button 62, brings up POSITION entry screen 66 indicating a parent title 32d of parent ISSUE idea 52a, in a parent text-entry box 68, in this case the title of the top ISSUE: "Considerations In Buying A New Car". The user may enter a position title 32d in POSITION title text-entry box 70 (in this case "Old Cars Are Expensive") and a description 32e for this new POSITION idea 52b. The data entered for the POSITION idea 52b will form a second record in the database 32, as before, indicating the idea type (P for POSITION) and value number 32f (defaulting to 100) but unlike before, will also include an entry of a parent node 52a referencing by record number 52a parent ISSUE idea 52a.

Referring now to FIGS. 4 and 3, the new node 75 for POSITION idea 52b will appear in the tree mode screen 54 including a colored indicia 74 indicating that the POSITION idea 52b is that of a POSITION. A selection of node 75 of POSITION idea 52b using the mouse 20 promotes its title: "Old Cars Are Expensive" into the text window 56. The hierarchy of the nodes of ISSUE idea 52a and POSITION idea 52b are shown by line 79 connecting particular idea-identifiers 52 and by the colors of the boxes surrounding the selected node.

This node 75 may be dragged using the mouse 20 to any position on the tree mode screen 54 while being visually connected by branch line 79. Two modes of repositioning are allowed using two buttons on the mouse 20. When a node 75 ids "dragged and dropped" using the left mouse button, only that node 75 is moved. When the same action is performed using the right mouse button, that node and all children nodes are also moved. Children nodes 75, representing those ideas 52 in the database 32 referring to a parent 32b by record number 32a, are always shown lower in the diagram (by default) of tree mode screen 54 than their parent nodes 75, but may otherwise be freely moved about the screen by clicking and dragging according to well known conventions in graphical user interfaces. When the node 75 is dropped, the new coordinates for the node 75 are stored in the database 32 as the node coordinates 32g. In this way, a reading of the database 32 may always allow depiction of the latest tree diagram in the tree mode screen 54.

If a new POSITION idea 52b is to be added under the top ISSUE of ISSUE idea 52a, the ADD button may again be pressed and a new POSITION enrolled at the same hierarchical level as the POSITION of idea 52b. In this example, however, the POSITION idea 52b is selected and upon pressing the ADD button 62, process block 76 is invoked to allow the entry of data for an ARGUMENT idea 52c relating to ARGUMENTS or another ISSUES idea 52a.

In this case, a selection entry screen 78 appears showing the parent 32b in the context of the selection of POSITION idea 52b, in the title, "Old Cars Are Expensive," and allowing selection of either a SUPPORTING ARGUMENT, OPPOSING ARGUMENT, or a new ISSUE by radio buttons 85.

If a SUPPORTING ARGUMENT is selected, the program provides SUPPORTING ARGUMENT entry screen 80 indicating again the title 32d of the parent "Old Cars Are Expensive" and showing the text "SUPPORTING ARGUMENT" 81 and allowing placement of a new argument title 32d in SUPPORTING ARGUMENT title text-entry box 82 and description 32e in SUPPORTING ARGUMENT description text-entry box 84 as is generally shown above.

In the present example, three ARGUMENT ideas 52c–e are then added beneath POSITION idea 52b using this or a similar entry screen, each occupying a common hierarchical level as result of common dependency on common POSITION idea 52b. Corresponding nodes 75 appear at a single level beneath the node 75 of POSITION idea 52b, however, the locations of these nodes 75 may be freely changed as described above.

Specifically, and referring to FIG. 3, ARGUMENT idea 52c shows its dependency on POSITION idea 52b by listing as a parent 32b record number two (that of POSITION idea 52b). ARGUMENT idea 52c has a type 32c of "SUPPORTING ARGUMENT" (represented by an S) indicating that it supports the POSITION idea 52b that "Old Cars Are Expensive" and has the title of "Repair Costs Increase".

The two OPPOSING ARGUMENTS of idea 52d and idea 52e enrolled in records number four and five of the database 32 have the titles 32d of "Insurance Costs Decrease" and "Loan Payments End". Similar data shows their type 32c and parent 32b.

Referring now to FIG. 4, although ideas 52c, 52d and 52e occupy a single level of the hierarchy, they may have different indicia 74 typically being different colors indicating whether they are OPPOSING ARGUMENTS or SUPPORTING ARGUMENTS. Thus the general relationship of the ideas 52 to other ideas is easily viewed and multiple types of relationships may be indicated, not just the dominant/subservient relationships of an outline.

Referring again to FIG. 4, an edit button 65 allows editing of any selected node 75 meaning editing of the record of the underlying idea 52 in the database 32. The edit button 65 allows general text editing including deletion and insertion of characters and the like into the title 32d and description 32e. A next button 67 moves one through the hierarchy in a level-by-level left to right sequence by moving down the records of the database 32. Previous button 88 moves one backward in the hierarchy or moving up the records. A menu item 90 allows editing of various features of the drawings including lining up rows evenly and shortening lines 79. Navigation through the tree is also provided through the use of the computer keyboard arrow keys (up, down, left and right).

In the tree mode screen 54, a challenge button 57 may be activated whenever a POSITION node 75 or an ISSUE node is selected. The challenge button 57 in its simplest embodiment provides a set of open-ended questions helping the user to determine what possible arguments might be applied against a given POSITION or positions applicable to a particular ISSUE. For example, the challenge button may produce a list (not shown) of questions having to do with cost impact, environmental impact, and other questions regarding a POSITION. Checking one of these open-ended questions will import the text of the question into the title block of a new ARGUMENT entry screen 80 that may be edited by the user.

In yet another embodiment, the open-ended questions or statements produced by pressing of the challenge button 57 may be augmented with key words recognized from the POSITION 52b and ISSUE 52a by comparing text in those idea-identifiers 52a to a list of key words and syntactical constructions as is understood in the art. In this case, the challenge may provide the techniques of artificial intelligence to the problems of generating ideas. Alternatively, the user may provide key terms of POSITIONs or ISSUEs within delimiters such as quotation marks to allow those terms to be imported into the challenge questions.

The questions may reflect the experience of experts in certain areas and thus may be selected by the user based on general generic categories. The population of the database with new ideas based on these questions may be facilitated by allowing the user to simply check a box next to relevant challenge questions or statements which then become new idea identifiers appropriately labeled. The new idea identifiers may be edited by conventional editor operations.

Referring still to FIG. 4, an outline may be generated of data of the database 32 collected using tree mode screen 54 by pressing a text outline symbol icon 92. Referring to FIG. 5, the outline mode screen 94 displays the titles 32d of the ideas 52 representing parent nodes as paragraphs 96 and the titles of children nodes as subparagraphs 98 beneath the paragraphs 96 and indented from those subparagraphs 98. Subparagraphs 98 may be further placed under other subparagraphs 98 indented therefrom in the same way that children nodes may be parents to other children nodes. Standard outline numbering 100 is provided for the paragraphs.

The value number 32f noted above and representing the priorities or importance of ideas 52 is displayed above the paragraphs 96 and subparagraphs 98 of a given level in the hierarchy (thus having the same level of indenting) and the paragraphs 96 and subparagraphs 98 of a given level are arranged in order according to the value number 32f. The indicia 74 of the nodes 75 in the tree mode screen 54 become text labels such as: "SUPPORTING ARGUMENT", "OBJECTING ARGUMENT" or "ISSUE" in the outline mode screen 94 and the outline may be printed by invoking a print menu item 106. The outline, composed only of standard typographical characters may be easily stored, transmitted and reproduced by others using a common file structure such as rich text format (RTF) well known in the art.

Pressing a tree icon 108 returns the user to the tree mode screen 54. In yet another embodiment of the invention, both the tree mode screen 54 and outline mode screen 94 may be shown simultaneously on a split screen. In this case, a synchronous cursor may move between paragraphs and nodes so as to provide a matching of different elements of the two documents.

In either of the tree mode screen 54 or outline mode screen 94, the option menu 58 may be used to obtain and adjust the value numbers 32f using a priority window 115 shown in FIG. 6. This priority window 115 is only available if an idea 52 has been selected having peer ideas 52 of a same hierarchical level. In this case, each of the titles 32d of the peer idea-identifier 52 are shown in successive text list boxes 110 in the priority window 115 showing the parent POSITION 117. The text list boxes 110 are arranged in a linear order denoting priority per the value number 32f associated with the idea 52 of the text list box 110. Each of the text list boxes 110 further includes a slider bar 112 having a slider element 114 that may be moved left or right so as to change the value numbers 32f associated with the idea 52 of the given text list boxes 110 as displayed in the upper left hand corner by numerals 116.

Changes of the value numbers 32f using the priority window edit the underlying database 32. Generally the value numbers 32f will be stored to a greater precision than that shown by the corresponding numerals 116. Thus the value numbers 32f may range from 0–10000 while only the three most significant digits are displayed. This allows a simplified display to the user and yet preserves ordering even when the user has assigned identical numerals to each text list box 110. Thus, for example, if the user tries to shift (using the slider elements 114 described below) all text list boxes 110 to have a priority of 100 (all sliders to the far right), the actual numbers stored in value numbers 32f of the database would be 10000, 9999, 9998, 9997 . . . They would be displayed as numerals 16 as 100,99,99,99.

Value numbers 32f of ideas 52 of a same hierarchical level may be readily changed in one of two ways. In the first way, a particular text list box 110 is selected and dragged by means of the mouse 20 according to techniques well known in the art producing a phantom outline 120. The phantom outline 120 may be repositioned on another text list box 110 as shown by arrow 122. When it is released as shown in FIG. 7 at process block 124, then at succeeding process block 126, the program 30 moves the existing text list boxes 110 down one in the list so as to change their relative priorities.

At process block 128, the value numbers 32f of each of the reorganized text list boxes 110 are adjusted so that the value numbers 32f of lower text list boxes 110 are truncated at the value numbers 32f of the upper text list boxes 110. Thus, for example, if the middlemost text list box 110 related to an idea 52 having a value number 32f of sixty-eight is placed at the top of the list, the topmost text-entry box having a priority of one-hundred moves down one position and has its priority truncated to sixty-eight. This truncation simply reviews the records of the database 32 after each such move and tests and truncates the value numbers 32f against a collected maximum. A similar process takes place when you move an item down the list. The system insures that the values above the item are raised.

This truncation process also occurs when the slider elements 114 are used so that the slider elements 114 of all lower text list boxes 110 follow the slider element 114 above them as that slider element aligns with them as that slider element 114 is moved to the left to produce a lower priority number. Any priority numbers of lower text list boxes 110 that would be higher than the current value imposed by the slider element 114 on the upper text-entry box are also moved to remain at least equal and no greater than that numerical priority. Similarly if the slider is moved up, the system automatically adjusts the value of higher priority items up. This two-step process of ordering and valuing provides a simple and intuitive mechanism for prioritizing data superior to just valuing the data insofar as it gives the user a comprehensive graphical interface.

The value numbers 32f cause an automatic rearrangement of the subparagraphs in order of their priority when the outline mode screen 94 is refreshed and can reorder the nodes of the tree mode (in the relevant level) on a left to right basis. The value numbers 32f may also be used to highlight dominant paths being paths through the idea 52 and lines 79 having the highest value numbers 32f at each hierarchical rank or to provide leaf node totals at the bottommost idea-identifiers 52a indicating paths which tend to have high value numbers 32f in them. These features may provide for additional insight into the thought processes underlying the idea-identifiers.

The present invention allows the user to independently manipulate two aspects of the data: ordering and weighting. If a weighted list of items is to be produced, one or more users could be asked to simply enter value numbers 32f but with a large number of text list boxes 110 this is ineffective or confusion. The present invention thus allows a two step process. First the text list boxes 110 can be ordered using the drag and drop method and then the text list boxes can be weighted by dragging the slider bars. The present inventors have found that during the "weighting" phase, the user may make some modifications to the order. Thus there may be a couple of passes "order", "weight", "order", "weight" before the activity is completed. By using graphical tools, this can be accomplished quickly, thus doing a job with relative ease, where it would be accomplished poorly or not completed at all if numeric entry alone were used. As used herein, it will be understood that the terms dominant/subservient and parent/child are relative terms and that, for example, parent nodes may be children to other nodes and children nodes may be parents to other nodes per conventional usage.

Once a database 32 is created it may be saved and recalled for further use. In this way, generic databases for particular problems may be created and provided to the user to serve a framework for their particular problems. A directory of databases is provided for this purpose and standard-editing tools described above may be used to fit these to a particular problem. It is envisioned that a comprehensive set of such framework databases will eventually come into existence based on this tool such as may be traded and even bought and sold between users.

It is specifically intended that the present invention not be limited to the embodiments and illustrations contained herein, but modified forms of those embodiments including portions of the embodiments and combinations of elements of different embodiments as come within the scope of the following claims.

I claim:

1. A program for the organization of ideas using an electronic computer, the electronic computer having a user input devices and a graphics display, the program comprising instructions executed on the electronic computer to:
   (i) accept text identified ideas from the user via a user-input device;
   (ii) display representations of the text identified ideas on the graphic display as organized into a spatial sequence having an order;
   (iii) accept weighting instructions from the user via a user-input device to link the text identified ideas to a weight value selected from a range of possible weight values greater in number than the number of text linked ideas;
   (iv) accept resequencing instructions from the user via a user-input device to change the order of the spatial sequence; and
   (v) modifying the weight value to remain in monotonic relationship with the changed order of spatial sequence;
   whereby separate ordering and weighting of the ideas may be rapidly manipulated.

2. The program as recited in claim 1 wherein the computer further executes the stored program to receive the resequencing instructions by moving a given representation within the spatial sequence using the user input device.

3. The program as recited in claim 1 wherein the computer further executes the stored program to display a slide control for each representation that may be manipulated by the user input device to change the weight value associated with the representation.

4. The program as recited in claim 3 wherein the computer further executes the stored program so that when a slide control is manipulated, the computer modifies the weight value of at least one stored text identified idea so that the numeric priorities of all stored text identified ideas remain monotonic with respect to the spatial sequence.

5. The program of claim 1 wherein the computer further executes the stored program so as to display the stored text identified ideas in a text outline according to the numeric priorities.

6. The program of claim 1 wherein the computer further executes the stored program so as to display representations of the stored text identified ideas in a tree diagram according to the numeric priorities.

7. A program for the organization of ideas using an electronic computer, the electronic computer having a user input device and a graphics display, the program comprising instructions executed on the electronic computer to:

(a) display representations of the ideas on the graphic display in a tree mode in which representations of ideas are arranged as a tree structure, the tree structure including child and parent nodes at different levels representing ideas of comparable types at each level and branches visually connecting child nodes to parent nodes so as to identify logical dependencies;

(b) display a priority window including list text boxes denoting ideas at one level having the same dependency within the tree structure where such boxes are arranged in linear order denoting their priority value;

(c) allow weight values to be assigned to the ideas, the weight values selected from a range of possible weight values greater in number than the number of ideas at the one level; and (d) allow the text boxes to be dragged and dropped into different linear positions in order to automatically reorder their priority values while modifying the weight value to remain in monotonic relationship with the changed priority values.

8. The program of claim 7, wherein the text boxes of the priority window displayed in step (c) further include slider bars for changing the value associated with the idea corresponding to the box and wherein the program includes a further step to:

(e) allow the slider to be moved along the bar in order to manually weight values of the idea corresponding to the box.

9. A program for the organization of ideas using an electronic computer, the electronic computer having a user input device and graphics display, the program comprising instructions executed on the electronic computer to:

(a) display representations of the ideas on the graphic display in a tree mode in which representations of ideas are arranged as a tree structure, the tree structure including child and parent nodes at different levels representing ideas of comparable types at each level and branches visually connecting child nodes to parent nodes so as to identify logical dependencies;

(b) display a priority window including list text boxes denoting ideas at one level having the same dependency within the tree structure and arranged in linear order denoting their priority value where such boxes have slider bars for changing the weight value associated with the idea corresponding to the box; and (d) allow the slider to be moved along the bar in order to manually adjust the weight values of the idea corresponding to the box while preserving monotonicity between priority value and weight values.

10. The program of claim 9, wherein the program includes a further step:

(e) allow the text boxes to be dragged and dropped into different linear positions in order to automatically reorder their priority values.

* * * * *